Patented June 17, 1947

2,422,251

UNITED STATES PATENT OFFICE 2,422,251

STORAGE OF ACETYLENE

Maurice O'Brian, St. Louis, Mo., and Edward R. Biggins, Indianapolis, Ind., assignors, by mesne assignments, to The Linde Air Products Company, a corporation of Ohio No Drawing. Application September 13, 1941, Serial No. 410,792

9 Claims. (Cl. 206—0.7)

This invention relates to the storage of dissolved acetylene in containers which are provided with a porous absorbent material or filler. More particularly, the invention comprises an improved filler for acetylene containers and a method of manufacturing such a filler.

Although a large number and a wide variety of materials have been proposed as fillers for acetylene containers, and several materials have been used successfully, all such materials have shortcomings. Examples of such materials are pulverized charcoal, kieselguhr, kapoc, balsa wood, and asbestos. Balsa wood, kapoc, and charcoal are relatively expensive, insufficiently heat resistant, and combustible. The pores in fillers composed of kieselguhr, kapoc, balsa wood, or asbestos are not of uniform size, and the spacing of the pores in such fillers is also not uniform. Kapoc, kieselguhr, charcoal, or asbestos tend to settle after the containers have been filled, due to the shaking which the containers receive in handling operations, thereby leaving voids and partly defeating the purpose for which the filler is used.

The filler which has been found most generally suitable prior to that herein disclosed consisted of a mixture of cement, silicious material such as diatomaceous earth, charcoal, asbestos fiber, and water. When properly compounded, and after thoroughly hardening by setting, and after drying, such a filler has a density of about 28½ lbs. per cubic foot and a porosity of from about 75% to about 80%, the porosity largely depending on the porosity of the charcoal. Although the cement-charcoal type filler has enjoyed extensive successful commercial use, such a filler is relatively expensive and is heavier per cubic foot than is desirable. Because of the heterogeneous composition of a cement-charcoal filler, and its tendency to shrink during the setting and drying operations, it is difficult and time-consuming to fill a container with such a filler so that a uniformly porous material having no objectionable voids will result. Moreover, considerable time is required for charging acetylene into a container provided with a cement-charcoal filler.

The principal object of this invention is to provide a filler for acetylene containers which overcomes the disadvantages of the previously known fillers. Other objects of the invention are to provide a monolithic filler for acetylene containers, which has high porosity and pores of smaller and more uniform size and of more uniform distribution than the fillers heretofore known; to provide a filler which will permit rapid charging of acetylene into the containers; to provide a filler which may be easily and economically prepared and which is of light weight per cubic foot; to provide a filler which may be readily and quickly filled into a container so as to leave no objectionable voids or cavities therein, which will form no objectionable cavities in the container while setting and drying, and which will not disintegrate or settle within the container under handling conditions; to provide a method of manufacturing such a filler; and to provide a method of preparing containers filled with such a filler.

The acetylene container filler of this invention comprises the calcium silicate product obtainable by chemical interaction, in the presence of water, between lime hydrate and a silicious material, such as sand, consisting essentially of silica. When such a product is filled into a container in a semi-fluid condition and subjected to a hardening or setting process, and to a drying process, a strong, light-weight, highly porous, substantially non-frangible, monolithic mass is formed which is eminently suitable for storing acetylene dissolved in a solvent such as acetone. If desired, asbestos fiber may be included in the semi-fluid mass to increase further the strength and resistance to shock of the monolithic filler.

Such a filler ordinarily has a density within the range of 30 to 24 lbs. per cubic foot and a porosity of 80% to 86%. The pores of this new filler are of smaller and more uniform size and are more uniformly distributed through the mass than are the pores of the cement-charcoal type filler. These extremely fine pores permit of higher porosities than are prudently usable in cement-charcoal fillers, and consequently, provide more surface for the absorption of the solvent in which the acetylene is dissolved—thus increasing the amount of acetylene with which a container can safely be charged. The fine pores also provide smaller passages within the filler mass so that the factor of safety against flame propagation through the container is as great as and even greater than that of a cement-charcoal filler. The extremely small size of the pores in the novel filler and the more uniform distribution thereof throughout the mass also minimize the amount of acetone or other solvent which escapes or is blown off in the liquid state with the acetylene when the latter is withdrawn from the containers. Another advantage is that no prefabricated porous material such as charcoal is required to provide the desired porosity, the calcium silicate of the filler being a porous medium as well as a bonding agent.

Because of the increased absorbing surface resulting from the increased porosity and the reduction in the size of the pores of the filler of this invention, and also because of the more uniform size and distribution of the pores in this filler, a container provided with such a filler can be fully charged with acetylene in appreciably less time than is required to charge fully a container provided with a cement-charcoal filler. Also, the increased porosity and the increased surface of the novel filler increase its gas absorption capacity and enable the charging of more acetylene, thus decreasing the cost of transportation per unit of acetylene. For example, cylindrical containers having an internal volume of 2.2 cubic feet, when provided with a cement-charcoal filler, can be charged, on an average, with 297.8 cubic feet of acetylene under a pressure of 250 lbs. per square inch gauge at 70° F. Containers having the same design and volume as those just described, when provided with the filler of this invention, can be charged, on an average, with 308.4 cubic feet of acetylene at the same pressure and temperature, an increase of about 3.6% in the acetylene charge. The new filler material does not react with acetone, and the gas absorbing capacity thereof does not decrease, regardless of the number of times a container is recharged.

It is well known that the porosity, density, and crushing strength of one type of filler, for instance, the cement-charcoal type, are interrelated. As the porosity increases, the density and the crushing strength decrease. A representative filler prepared in accordance with this invention, had a porosity of 82.75%, a density of 26 lbs. per cubic foot, and a crushing strength of 950 lbs. per square inch. This filler had a porosity about 5% greater, was approximately three times stronger, and was about 2½ lbs. per cubic foot (9%) lighter than the best of the previously known cement-charcoal fillers.

In addition to the above-enumerated advantages, the filler of this invention is also fully as safe as, and even safer, than the best of the previously known fillers, on the basis of standard "flash back," "hot-spot," and "bonfire" tests.

In general, the process of manufacturing the filler contemplated by this invention comprises mixing and chemically reacting lime hydrate and a silicious material consisting essentially of silica, in the presence of water. When these materials are reacted in suitable proportions and under proper conditions, as fully described hereinafter, a homogeneous, semi-fluid, hardenable mass is obtained which consists largely of a material corresponding in composition to a mixture of hydrated monocalcium silicate and gyrolite. This semi-fluid mass, in which asbestos fiber may be included, is filled into suitable receptacles or containers and subjected to a final setting or curing process in which the reaction between the lime and silica is completed and the mass is set into a hardened monolithic body. Thereafter, the containers filled with the monolithic mass are subjected to a drying or baking operation in which all of the free water and some of the combined water in the mass is driven off. In this condition, the container may be fitted with a valve and fusible safety plugs, and then charged with acetone and acetylene in the usual manner.

The silicious material employed in compounding the subject filler may be sand or some other granulated or finely divided and reasonably pure form of silica, such as diatomaceous earth. However, the best results are obtained by using a white sand of sufficient fineness to pass through a screen having at least 130 openings per square inch; the more finely divided the silica, the finer are the pores in the resultant product. If kieselguhr is used, the final product will be structurally weak unless the kieselguhr and lime are treated under high temperature and pressure for a prolonged period. Silica is a relatively inert substance and therefore should be in a sufficiently finely divided form so that the lime will react with it under the reaction conditions employed. Either commercial lime hydrate or lime hydrate prepared from quicklime may be used in manufacturing the filler, the latter being preferred. Asbestos fiber added to the semi-fluid mass increases the resistance to shock and the mechanical strength of the product without increasing the density thereof beyond an economical and reasonable value.

The proportions of lime, water, and silica may be varied somewhat, depending on the properties, such as density, porosity, and crushing strength, which are desired in the final product. The amount of water used should be substantially in excess of that theoretically required for completely hydrating the lime, and depends on the type of lime-hydrating equipment employed, less water being required when the lime is slaked in a closed hydrator than if an open hydrator is used. As an example of a filler prepared according to this invention, 10 pounds of quicklime (calcium oxide), 68 pounds of water, and 21.25 pounds of sand fine enough to pass a 130 mesh screen, were mixed, reacted, and filled into a container, and when hardened and dried, resulted in a monolithic filler having a density of 29.7 pounds per cubic foot and a porosity of 82.3%.

A mixture which results in a filler of optimum properties contains:

| | |
|---|---|
| Quicklime (CaO) per cent by weight | 36.7 |
| Silica (white sand of at least 130 mesh fineness) per cent by weight | 53.3 |
| Asbestos fibers do | 10.0 |
| Water lbs. per lb. of quicklime | 6.8 |

The ratio of silica to lime used in this mixture corresponds to that in a mixture of monocalcium silicate and gyrolite. The monolithic filler prepared from this mixture had a crushing strength of 950 lbs. per square inch, a density of 26 lbs. per cubic foot, and a porosity of 82.75%, the pores being invisible under a magnification of 960 diameters. To obtain this optimum filler the percentages of lime, silica, and asbestos may be varied over a range of about ±2% for each ingredient, but the amount of water must be held to about the proportion indicated, since the quantity of water employed predominantly determines the porosity, density, and strength of the resulting filler. If more silica is used than can be completely reacted by the lime under the process conditions employed, only the outer surfaces of the silica particles are reacted, leaving the inner portion of the silica particles unaffected. In such event, the final filler mass will be stronger, but it will also be heavier, than if the above-stated optimum proportions of ingredients are employed. By adhering to these proportions, a filler having a density of 28 to 24 pounds per cubic foot and a porosity of 80% to 86% is obtained. If untreated commercial lime hydrate is used, the final product is much heavier.

Further advantages which the filler of the invention possesses over the prior fillers are that the raw materials, such as sand, lime, and water, from which this new filler is manufactured are less expensive than the ingredients of the prior fillers, and are always readily obtainable. Moreover, the calcium silicate in the semi-fluid condition in which it is first obtained, is a uniformly homogeneous material which can be readily filled into containers. To fill satisfactorily a cylindrical container having an internal volume of 2.2 cubic feet with a cement-charcoal filler requires about fifty minutes. A container of the same size and design can be satisfactorily filled with the subject filler in three minutes or less, thus materially reducing the production cost of the filled containers.

The first step in the manufacture of the subject filler comprises slaking the quicklime. The water to be used for this purpose is preferably heated to about 160° F.-180° F. The quicklime is added to the heated water in successive amounts with continuous agitation, and after some of the lime has been slaked, the water starts to boil, since additional heat is supplied by the evolution of the heat of the hydration reaction, and a typically violent reaction ensues, as is usual when quicklime is slaked with water. The resulting mixture is allowed to cool in air to normal room temperature and to age for approximately 24 hours. During the aging period, in which the hydration of the lime is entirely completed, the mixture is preferably agitated about once every two or three hours. The resultant slaked lime (calcium hydroxide) has a high "putty volume," or expressed in another way, has an extremely slow rate of settling out of suspension. It is believed that the production of flocculent, non-settling lime hydrate is an important factor in obtaining as a final product a filler which has high porosity and high mechanical strength, coupled with relatively low density. By slaking the quicklime in the manner described above, the hydrated lime can be obtained in the desired suspended form. Another method of obtaining such a suspension of lime hydrate is by adding a small amount (between .1% and 1% of the total weight of the quicklime) of sugar to the water with the quicklime. Although, as indicated above, commercial lime hydrate may be utilized in place of lime hydrate prepared from quicklime, better results, particularly in the density and porosity of the final product, are achieved with the latter. This is probably because of the difficulty in obtaining a suitable lime suspension when commercial lime hydrate is the starting material.

Asbestos in fibrous form is added to and mixed thoroughly into the lime suspension, and to this mixture is added the finely divided silicious material. The resulting mass is thoroughly stirred to insure complete mixing, which may be done at normal room temperature, or at slightly elevated temperatures. The homogeneous mixture of suspended lime, silica, and asbestos is then heated in a closed vessel until its own steam pressure rises to between 25 to 40 pounds per square inch gauge and the mixture is maintained in this condition for ½ to 2 hours, or until the partial reaction of the lime and silica is complete and a semi-fluid mass consisting largely of calcium silicate is produced. This step in the process may be carried out at atmospheric pressure, but a longer reaction period is required and the final product does not possess as desirable properties as those obtained by carrying out the reaction under elevated pressure. If the steam pressure is increased above 40 lbs. per square inch gauge, the partial reaction period may be slightly decreased, but there is an upper practical limit to the pressure which may be used. The use of pressures greater than this limit, which is believed to be about 75 lbs. per square inch gauge, causes the mixture to react within itself too rapidly and to set into a hardened condition in the reaction vessel.

The partially reacted mixture is allowed to cool to normal room temperature and it may be allowed to stand at this temperature for about twelve hours, although this latter step is not essential. The semi-fluid mass is then stirred thoroughly and is in a suitable condition for filling into the containers. At the beginning of the partion reaction procedure, the mixture is relatively thin, and some of the water contained therein has a tendency to separate from the other ingredients. However, when the partial reaction of the materials is completed, the resulting mass is relatively thick, and there is little tendency for the water to separate from the other ingredients. If the mixture is not partially reacted as described above, when it is filled into the containers, some of the material will flow out of the top of the containers while being cured under steam pressure, thus resulting in the production of objectionable voids or cavities within the containers.

A container may be filled with the partially reacted semi-fluid material by forcing it into the container under pressure, or by first evacuating the container and permitting the semi-fluid material to be forced into the container by the atmospheric pressure. Depending on the size and shape of the container, it may be desirable, during the filling operation, to agitate the container, as by bumping on suitable mechanism, to insure that the container is completely filled with the semi-fluid material so that no objectionable cavities remain in which acetylene can accumulate. The filling opening of each container is then fitted with a small funnel-shaped extension or riser which is filled with the same mixture previously filled into the containers except that an additional 25% to 50% of water may be added thereto. The additional water causes the material in the riser to set more slowly than that in the container.

After the containers are filled with the semi-fluid mass and are fitted with the risers containing the more fluid material, they are placed in a pressure chamber, such as an autoclave, and treated for about eight hours under a steam pressure of about 125 lbs. per square inch gauge. This treatment completes the chemical reaction between the lime and silica, and causes the material to set into a hard monolithic mass. As the material in the container sets or hardens, air holes or other cavities which may be produced as a result of slight shrinkage of the material are filled with the more fluid material in the riser which flows down into the container. Steam pressures lower than 125 lbs. per square inch gauge may be employed, but a longer treatment period is then required. Higher steam pressures will somewhat shorten the treatment period, but not to an appreciable extent. Subsequently, the containers are removed from the autoclave, the risers detached, and the filled containers subjected to a baking or drying process.

The drying process may be carried out by placing the filled containers in an oven, the temperature of which is maintained between 400° F. and 450° F. The length of the drying operation will depend upon the temperature employed and upon the size of the containers, those having an internal volume of about 2.2 cubic feet being completely dried in about four or five days at a temperature between 400° F. and 450° F. When the same size containers are filled with a cement-charcoal filler, the baking operation at this temperature range requires about twenty-one days. The considerably shorter baking period is another improvement over the cement-charcoal type of filler, and results in appreciably decreasing the costs of the manufacturing operations. Furthermore, the novel filler can be dried safely at much higher temperatures than cement-charcoal fillers, because the former contains no charcoal which tends to burn or char at temperatures higher than about 850° F. If temperatures above 450° F. are used, the temperature at the beginning of the drying process must be maintained not higher than 450° F., since at higher initial temperatures, excessive steam pressures may be built up within the containers and result in the filler being cracked or part of the filler being blown out of the container. After subjecting the filled containers to a drying process at or below 450° F. for some time, the temperature may be gradually raised to about 800° F., thus permitting the containers to be dried in approximately three days. For the same size containers filled with a cement-charcoal filler, the baking operation at about 800° F. requires approximately nine days, and considerable care must be exercised to prevent the charcoal in this type filler from being disintegrated or burned.

Although a preferred composition, a preferred method of manufacturing the subject filler, a preferred method of preparing containers filled with this filler have been described in detail, it is contemplated that modifications of the composition and modifications of the methods may be made, and that some features of the invention may be employed without others, without departing from the spirit and scope of the invention. Also, other modifications which will occur to those skilled in the art, such as employing the subject filler as a filler in compressed gas containers other than acetylene containers, are also contemplated by this invention.

In accordance with accepted nomenclature, the term "calcium silicate" as used in the foregoing description and in appended claims includes not only the compound CaSiO₃, but also the silicates containing other ratios of silica to lime and the various hydrated forms of all such silicates and of the compound CaSiO₃, and also includes mixtures of all such compounds.

What is claimed is:

1. A filler in a container in which compressed gases are adapted to be stored, comprising a porous monolithic mass consisting substantially of calcium silicate and having good mechanical strength, a high porosity, and uniformly distributed fine pores invisible under substantial magnification.

2. A filler mass in a container in which compressed gases are adapted to be stored, comprising a porous monolithic mass of a calcium silicate in which the ratio of calcium oxide and silica is as substantially 53.3 parts by weight of silica to 36.7 parts by weight of calcium oxide, and said mass including up to 10 parts by weight of asbestos fiber based on the combined weight of the calcium, silica, and asbestor fiber, the amounts of calcium oxide and silica each varying not more than plus or minus 2%, said mass having a crushing strength over 900 pounds per square inch, a porosity in excess of 80%, and uniformly distributed pores invisible under a magnification of 960 diameters.

3. A gas package comprising a gas under pressure in intimate contact with and absorbed in the pores of a monolithic mass in a closable receptacle, said mass consisting essentially of calcium silicate having adequate mechanical strength, a high porosity, and uniformly distributed fine pores invisible under substantial magnification.

4. A gas package comprising a gas under pressure in intimate contact with and absorbed in the pores of a monolithic mass in a closable receptacle, said mass consisting essentially of calcium silicate and having a density substantially less than 30 pounds per cubic foot, a porosity of at least about 80%, and uniformly distributed extremely fine pores.

5. An acetylene package comprising a solution of acetylene under pressure absorbed within the pores of a monolithic mass in a closable receptacle, said mass consisting essentially of calcium silicate having substantially no free lime and having a porosity of at least about 80%.

6. In an acetylene container of the type in which acetylene is dissolved in a solvent absorbed in the pores of a filler mass, a filler mass in said container consisting essentially of monolithic calcium silicate having mechanical strength sufficient to resist disintegration of the mass during normal use and handling of the container, a porosity of at least 80%, and uniformly distributed fine pores.

7. In an acetylene container of the type in which the acetylene is dissolved under pressure in a solvent absorbed in the pores of a filler mass that fills the shell of the container, a filler mass in said container consisting chiefly of a monolithic body of a calcium silicate in which the ratio of calcium oxide and silica is as substantially 10 parts by weight of calcium oxide to between 13.25 and 21.25 parts by weight of silica, said mass having mechanical strength sufficient to resist disintegration of the mass during normal use and handling of the container, uniformly distributed pores that are substantially all so small as to be invisible under considerable magnification, and a porosity of at least 80%.

8. An acetylene container according to claim 7, in which said monolithic body also contains a relatively small proportion of inert fibrous material.

9. A method of producing a monolithic porous mass consisting essentially of calcium silicate in a closable container adapted for the storage of gas such as acetylene which method comprises partially reacting, within about plus or minus 2% for each ingredient, 36.7 parts by weight of quick lime with 53.3 parts by weight of finely divided silica with the use of about 6.8 parts by weight of water per part of lime; completely reacting the resulting semifluid mass in said container by subjecting it to heat and pressure corresponding to a steam pressure of at least 125 pounds per square inch gauge; and drying the resulting hardened mass by baking the container at a temperature above 400° F., said hardened mass completely filling said container and having a porosity of at least 80%.

MAURICE O'BRIAN.
EDWARD R. BIGGINS.

REFERENCES CITED

The following references are of record in the file of this patent:

UNITED STATES PATENTS

| Number | Name | Date |
|---|---|---|
| 1,407,588 | Skinner et al. | Feb. 21, 1922 |
| 1,574,380 | Endres | Feb. 23, 1926 |
| 661,401 | Fouche | Nov. 6, 1900 |
| 904,183 | Dalen | Nov. 17, 1908 |
| 662,258 | Dickerson | Nov. 20, 1900 |
| 1,591,397 | Ness | July 6, 1926 |
| 727,609 | Fouche | May 12, 1903 |
| 1,332,525 | Smith | Mar. 2, 1920 |
| 1,520,893 | Teitsworth | Dec. 30, 1924 |
| 1,932,971 | Huttermann et al. | Oct. 31, 1933 |
| 2,326,516 | Brown | Aug. 10, 1943 |

FOREIGN PATENTS

| Number | Country | Date |
|---|---|---|
| 65,270 | Sweden | May 2, 1924 |
| 76,112 | Sweden | May 30, 1929 |

OTHER REFERENCES

Organic Chemistry (second edition), Lowy and Harrow, New York, page 36—Copy in Div. 27.